July 28, 1959  W. LEWI  2,896,943
CONTINUOUS AUTOMATIC CLAMPING DEVICE
Filed Jan. 30, 1958  2 Sheets-Sheet 1
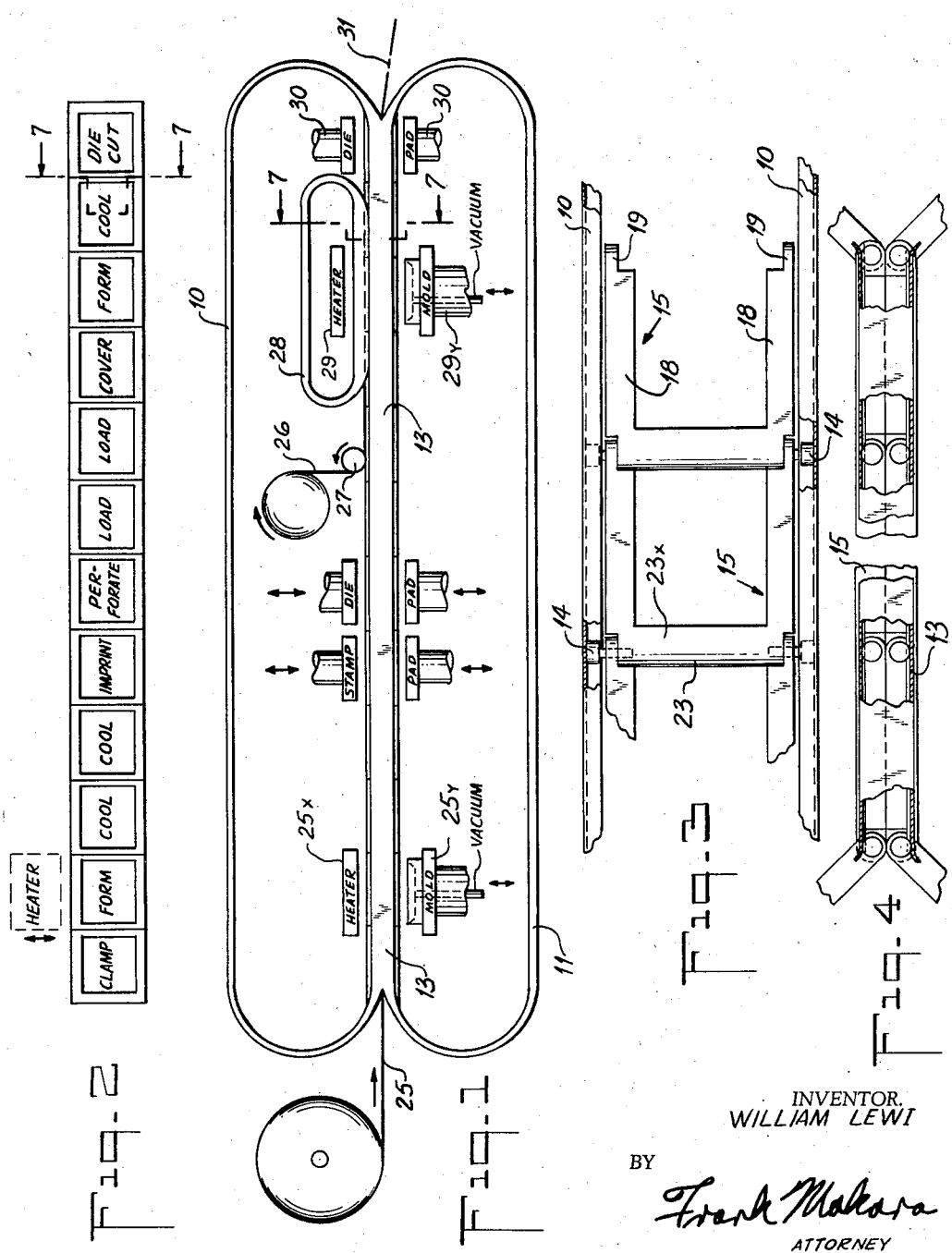
INVENTOR.
WILLIAM LEWI
BY
Frank Makara
ATTORNEY July 28, 1959 W. LEWI 2,896,943
CONTINUOUS AUTOMATIC CLAMPING DEVICE
Filed Jan. 30, 1958 2 Sheets-Sheet 2
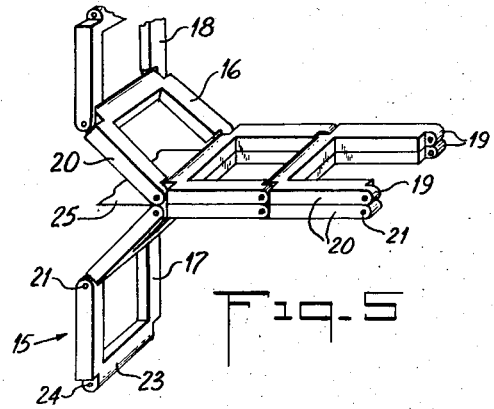
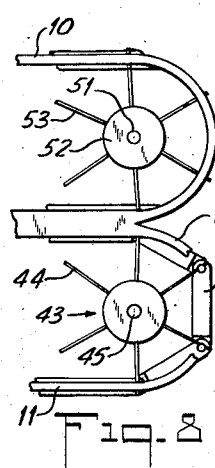
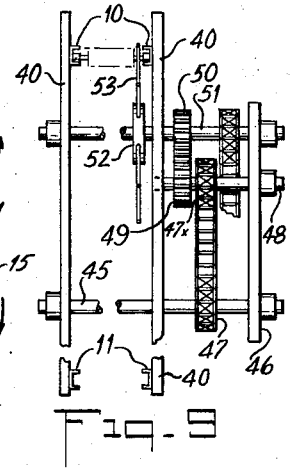
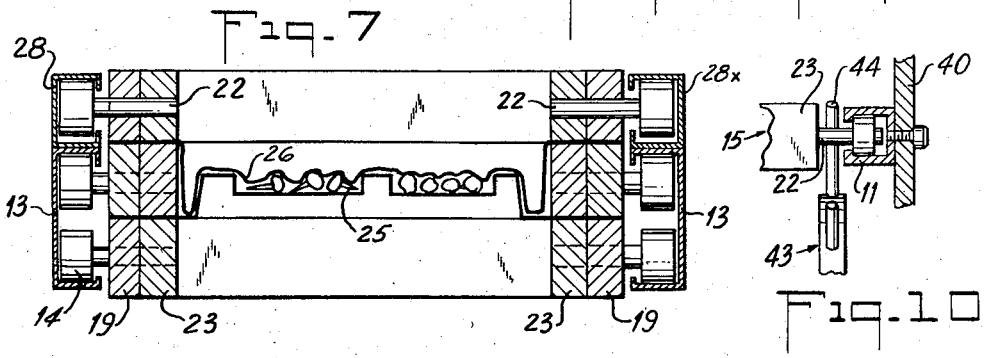
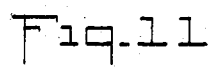
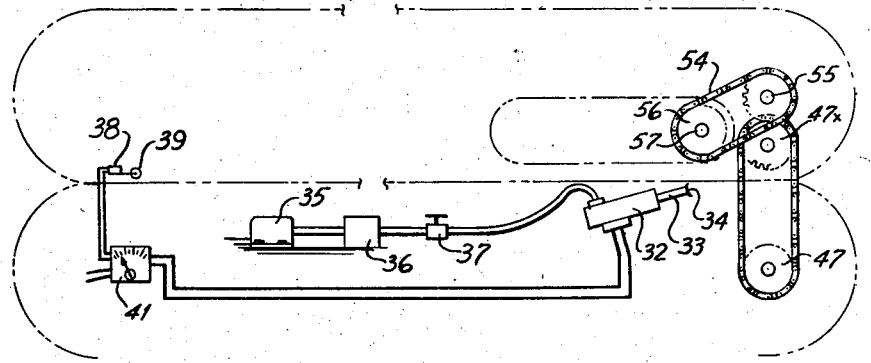
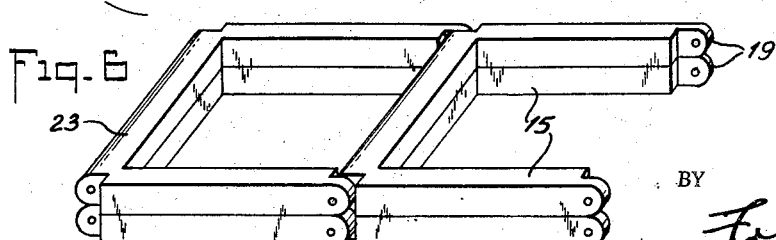
INVENTOR.
WILLIAM LEWI
BY
Frank Makara
ATTORNEY United States Patent Office 2,896,943
Patented July 28, 1959

2,896,943

CONTINUOUS AUTOMATIC CLAMPING DEVICE

William Lewi, Merrick, N.Y.

Application January 30, 1958, Serial No. 712,221

5 Claims. (Cl. 271—2.1)

This invention relates to an automatic clamping device and more particularly to a pair of continuously mating chain of frames.

It is an object of this invention to prepare skin-tight packaged material.

It is a further object to provide a pair of frame chains which will continuously seize sheet material fed between said chains of frames and hold said seized material for a plurality of successively formed operations.

It is another object to provide an automatically operated apparatus having a seized sheet held between a pair of moveable frames, said sheet being moved in an intermittent manner stopping only to have operations performed upon the sheet, said sheet being then covered with a second sheet to form a skin-tight package.

These and other objects and purposes of this invention will become apparent upon reading the following descriptive disclosure taken in conjunction with the accompanying drawing in which, Fig. 1 is a schematic side view of the apparatus showing a pair of continuous channels for holding chains of frames for guiding the respective continuous chains made up of said frame elements, and showing a third channel for a chain of frames disposed so as to superimpose its frames matingly upon the mated pair of frames, Fig. 2 is a block diagram showing the successive stages of operation performed upon the sheet material clamped rigidly between the mated frame elements, Fig. 3 is a top view of a chain showing a pair of frame elements hingedly secured to one another, Fig. 4 is a side view of a portion of a continuous chain of frame elements shown disposed in a guide channel, broken away-in-part, Fig. 5 is an isometric view of a pair of chains, showing the manner of mating a top frame to an identical bottom frame, Fig. 6 is a perspective view of a pair of frame elements of two chains, showing the exact registry of mating a top frame to a bottom frame, Fig. 7 is a view taken on line 7—7 of Fig. 1 and Fig. 2 showing the sheet material of two plastic films formed into a skin-tight package within the apertures of a plurality of superimposed mated frames, Fig. 8 is a view broken-away in part, of the sprocket wheels used to advance the pair of chains an identical amount of travel, Fig. 9 is a side view of a conventional drive mechanism for driving the pair of chains of frames as well as for driving a third or auxiliary chain of frames, Fig. 10 is an enlarged view partly in section, showing the manner in which the sprocket teeth pushingly engage a frame hinge pin, and Fig. 11 is a schematic side view showing the manner of connecting a conventional electrically operated timer to a hydraulic ram to effect a pushing of the frames intermittently to permit operations to be performed on the sheet material held between superimposed clamped frame elements.

This invention is concerned with skin packaging and for its novel features teaches the seizure of a material by a set of frames. The frames, all identical are apertured and disposed hingedly to form two continuous chains. The chains are disposed one over the other with a section of each chain clamped to a like section of the other chain, with the respective frames of the respective chains held in mating relationship.

The plurality of mated and superimposed frames are held in seized relationship by a pair of opposed channels with the frames securing the seized sheet material completely around the periphery of the respective apertures.

Referring now to an illustrative embodiment of this invention shown in Figs. 1 to 11, a top pair of ovalid U-shaped tracks or channels 10 are disposed directly over a bottom pair of U-shaped tracks or channels 11, said channels 10 and 11 uniting to form a common U-shaped channel or track 13 of about the channel widths of tracks 10 and 11.

The tracks 10, 11 and 13 function as guides for roller wheels 14 disposed to hold frames 15 in a hinged chain relationship.

The frames 15 are of U-shaped configuration having a flat top surface 16 and a flat bottom surface 17 (Fig. 5). The opposed legs 18 of a frame 15 are provided with lips or rounded narrow width and segments 19 continguous with the respective exterior leg wall 20. The end segments 19 are provided with apertures 21 for received shanks 22. The respective shanks 22 are secured to the respective rollers 14 to form hinge pins and are used to secure consecutive frames 15 together.

The base 23 of the U-shaped frames 15 are rounded and provided with cut-out portions at each end making the base 18 of lesser width than the distance between the respective outside walls 20 of a frame. The length of the base 18 is such as to fit snugly between the pair of end segments 19 of an adjacent frame 15. The respective ends of a base element 23 are provided with boreholes 24. The shank 22 of a hinge pin passes through an end aperture 21 and into the borehole 24 of the base 23 of the adjacent forwardly disposed frame 15.

As shown in Fig. 3, a continuous chain is formed by linking successive frames 15 together by pairs of hinge pins.

One chain of frames 15 is in effect disposed in channel or tracks 10 by means of the respective rollers 14 disposed in said track 10. The other chain of frames 15 is in effect disposed or confined to travel in the channel or track 11.

As shown in Figs. 1 and 7 the separate channels 10 and 11 combine to form a common horizontally disposed channel or track 13.

Sheet material, for example thermoplastic film 25, is fed from a roll of film (Fig. 1) between opposed frames 15 and clamped rigidly and immovedly between the three sides of a top frame 15 and the respective bottom frame 15. As shown in Fig. 3, the base 23 is provided with a round end portion and flat top and bottom walls 23X. Thus the film 25 is held flat on all four sides of a square aperture between the flat walls of a pair of superimposed frames 15, i.e. the two respective leg walls 16 and 17 and the two walls 23X of the superimposed frames, with the aid of the base walls 23X of the adjacent interlocked chain frame 15. In other words, to completely lock film 25 between superimposed chain lengths, two frames 15 of each chain must be used. The film 25 seizingly locked between a pair of top frames 15 to a mated pair of bottom frames 15 is pushed down the opposed common channels or tracks 13 in an intermittent manner, being held in locked relationship until it emerges from the channel 13 after all required operations have been performed on the seized film disposed in between a pair frame of superimposed frames.

The various operations for skin packaging according to this invention are shown in Fig. 1. Thus the film 25 is first clamped or seized lockedly between a top and bottom or superimposed frames. Next the clamped film is moved intermittently and is heated by means of a conventional heater 25X which is swung over the frames 15 to soften the film whereupon a first vacuum mold 25Y is lifted to contact peripherally the seized heated film with a respective aperture of a frame 15. A vacuum is applied to the mold surface within the area of peripheral contact of the heat softened film thereupon sucking the film downwardly into or around the mold to assume the mold configuration, for example a pair of crossed ridges dividing the now molded film into four compartments. The molded clamped film is then moved forwardly, Figs. 1 and 2, being cooled in this time whereupon it is next printed with desired indicia such as instructions or advertising. The next intermittent stage results in perforation of the molded film. Thereafter the molded film is loaded in its respective compartments with, for example, nuts and bolts, etc. After loading a second film 26 of thermoplastic film is applied using an idler wheel 27.

In order to apply a second film 26, a third chain of frames 15 is necessary. This chain of frames 15 is disposed in U-shaped channel or track 28. As shown in Figs. 1 and 7, the bottom portion of track 28 is horizontal and fixedly secured to the horizontal track 13 as by spot welding.

The film 26 is seized or clamped between the chain of frames in track 28 and the top chain of frames in track 13 to give a set of three identical frames 15 superimposed accurately directly over one another in vertical relationship.

The pair of films 25 and 26 is next moved so that the film 26 is stopped intermittently while a second heater 29 is swung into position over the temporarily stopped film 26, heating it to a softened condition whereupon mold 29Y is raised to contact bottom film 25 and vacuum is applied to mold 29Y sucking air from beneath softened film 26 through the perforations of hardened film 25 thereby causing film 26 to collapse and seal to film 25 thus producing a skin-package containing the loaded nuts and bolts. The film 26 is allowed to cool during one intermittent stop whereupon, the skin packaged continuous ribbon is moved to the die cutting device 30 which cuts the film peripherally at the aperture walls of the adjacent frames 15. The cut skin-packaged material, i.e. nuts and bolts is dropped as a unit into a bin (not shown) and the scrap ribbon of film 25 is removed to waste as shown at 31. The scrap ribbon of film 26 may be removed in any suitable manner.

The operations performed on films 25 and 26 shown in Fig. 2 are done in intermittent manner so that as the clamped film 25 moved from left to right Figs. 1 and 2, the indicated operations are all being performed at each stop of the co-acting chains of frames. Thus for example while one clamped film 25 in an aperture of superimposed frames 15 is being molded on mold 25Y, another already molded and cooled clamped film 25 section is being imprinted, another is being perforated, etc.

In order to move the clamped chains of frames a percise amount each time a hydraulic jack 32 is employed having a piston 33 of a pre-determined stroke or travel. The head of the piston 33 is provided with a curved plate 34 which engages the base 23 of each frame 15 of the lower chain of frames traveling in part in channel 11. Thus each outward thrust of piston 33 moves the clamped chains a definite distance. To accomplish this piston thrust intermittently an electric constantly running motor 35 actuates a pump 36. The oil under pressure passes through valve 37 and into the base of the hydraulic jack 32.

The actuation of the hydraulic piston 33 is done by means of a conventional micro-switch 38. A spring loaded roller wheel 39 is secured to the general framework 40 (Fig. 9) supporting the channels 10, 11 and 13 and set to contact a base 23 of a suitable lower frame 15. The actuation of the conventional wheel 39 actuates in turn the conventional micro-switch 38 which in turn actuates conventional timer 41 for a pre-determined duration of time. Timer 41 has three functions, namely a heating cycle, a forming cycle and an initial cooling cycle. After the cooling cycle is completed the timer actuates the hydraulic piston 33 causing it to move exactly one frame length.

Micro-switch 38 may be used to actuate all operations performed on the films 25 and 26 while such films are intermittently stopped.

In order to have absolute timed movement of all chains of frames, the lower chain actuated by piston 33 is connected to the top chain of frames by a conventional sprocket mechanism.

To this end a suitable sprocket wheel 43 is provided with suitable spaced apart spokes 44 (Fig. 8) and is journaled to shaft 45. The spokes 44 contact respective shanks 22 protruding from respective frames 15.

Shaft 45 extends beyond the framework 40 (Fig. 9) into a support plate 46. A suitable gear 47 is keyed to shaft 45 and a like gear 47X is keyed to an idler shaft 48. A chain 47Y connects gears 47 and 47X. A suitable gear 49 is keyed to shaft 48 and mated with another suitable gear 50 keyed to shaft 51. A top sprocket wheel 52 is keyed to shaft 51 and the spokes 53 thereof engage the suitable shanks 22 traveling in top channel 10.

By means of the mechanism in Fig. 9, the top sprocket wheel 52 is rotated in a counterclockwise manner while the bottom sprocket wheel 43 which motivates wheel 52 is rotated the identical number of degrees in a clockwise manner.

As also shown in Figs. 9 and 11 shaft 51 actuates chain drive 54 through a suitable gear 55. The chain 54 actuates a gear 56 secured to a shaft 57 to which a third sprocket wheel, identical to wheel 52 is attached, said third sprocket wheel being used to move the third chain cf frames in track 28 an identical distance equal to that of the chain of frames located in track 10.

In the above-described embodiment of this invention the chain of frames held in parallel tracks 10 and the chain of frames held in parallel tracks 11 unite in a common horizontally disposed pair of opposed track sections 13. Clearly tracks 13 are in effect portions of top circuitous tracks 10 and portions of bottom circuitous tracks 11. In short tracks 10 and 11 merge into track 13.

Track 13 is of such width as to squeeze the vertically disposed rollers 14 of a top and of a bottom frame (Fig. 7) thereby seizing the film 25 between the respective top and bottom frames throughout the length of track 13 in a rigidly clamped relationship.

Many variations in the configuration of the clamps 15, the number of operations performed on the film, etc. are within the scope of this invention.

Thus each operative station may be provided with individual micro-switches in lieu of one master micro-switch.

Also it is feasible to eliminate the third or auxiliary chain of frames and use a cardboard sheet having coated areas of heat sealable adhesive thereon in lieu of film 26.

Also in lieu of a plastic film 25, a continuous cardboard sheet having pre-cut apertures therein may be fed between a top and a bottom frame 15. In such instances large objects like door-knobs may be skin-packaged. Also the feed sheet stock may be pre-perforated as well as pre-die cut if desired. In all such cases the covering film 26 is sucked onto and heat sealed to the packaged material disposed in the sheet stock 25.

The basis of this invention is the provision of interlocked frames held in accurate superimposed clamped relationship, so that a sheet of material held between the clamped frames may have operations performed thereon.

Clearly the size of the frame aperture determines the size of the ultimate skin-package.

This invention has been described by illustrative embodiments but many obvious variations will now become apparent to those skilled in the art. However, all these obvious variations are deemed to be within the scope of this invention and are intended to be embraced within the claims herein.

I claim:

1. A device for skin packaging discrete material comprising a top pair of spaced-apart U-shaped circuitous tracks, a bottom pair of U-shaped spaced-apart circuitous tracks, said top and said bottom tracks uniting to form a common opposed U-shaped horizontally disposed track section of substantially twice the track width of said top and bottom tracks; a first plurality of frames hingedly secured to one another to form a chain disposed in said top track, and a second plurality of frames hingedly secured together to form a chain disposed in said bottom track; and a pair of opposed hinge pins disposed in interlocking relationship in successive U-shaped frames and said pins being in opposed vertical relationship in the respective opposed top and bottom tracks, each of said pins having a portion exteriorly protruding beyond said frames, and a roller rotatable secured to said protruding portion whereby said rollers of said hinge pins of respective superimposed frames disposed in said common horizontally disposed track sections squeeze said frames together in moving clamped relationship rigidly and immoveably seize a sheet of material held therebetween.

2. The device of claim 1 wherein the frames are U-shaped elements have opposed legs having apertured narrow lips and having a foreshortened base portion having boreholes on each end, said base portion being suitable to fit within the lips of said legs of said frame, said hinge pins being secured in respective lip apertures and boreholes of the base of contiguous frames.

3. The device of claim 2 comprising piston means for advancing the chain travel one frame length for each piston stroke and electrical timer means for actuating said piston means after the passing of a pre-determined duration.

4. The device of claim 3 comprising a suitable bottom sprocket wheel having spokes engaging the roller pin shanks of said bottom chain of frames; a suitable top sprocket wheel having spokes pushingly engaging the shanks of the top roller hinge pins and conventional means for transferring the clockwise rotation of the bottom sprocket into counterclockwise rotation of the top sprocket, whereby the spokes of the bottom sprocket are pushed by the hinge pins of the bottom chain and the hinge pins of the top chain of frames are pushed by the spokes of the top sprocket wheel.

5. The device of claim 1 comprising a third circuitous track disposed within said top circuitous track; a third chain of frames of identical frames to those of said first and said second chain of frames disposed in said third track, said third track having a horizontal bottom section engaging a portion of the horizontal section of said top track; and means for motivating said third chain in intermittent timed relationship with said top and bottom chains whereby said third track disposes a third frame in accurate superimposed relationship upon the respective superimposed frames of the top and bottom chains of frames.

References Cited in the file of this patent
UNITED STATES PATENTS

| | | |
|---|---|---|
| 1,485,141 | MacDonald | Feb. 26, 1924 |
| 2,083,618 | Salfisberg | June 15, 1937 |
| 2,167,179 | Joa | July 25, 1939 |
| 2,387,446 | Herz | Oct. 23, 1945 |